United States Patent
Koka et al.

(10) Patent No.: US 9,213,649 B2
(45) Date of Patent: Dec. 15, 2015

(54) DISTRIBUTED PAGE-TABLE LOOKUPS IN A SHARED-MEMORY SYSTEM

(71) Applicant: Oracle International Corporation, Redwood Shores, CA (US)

(72) Inventors: Pranay Koka, Austin, TX (US); David A. Munday, Santa Cruz, CA (US); Michael O. McCracken, San Diego, CA (US); Herbert D. Schwetman, Jr., Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 237 days.

(21) Appl. No.: 13/625,502

(22) Filed: Sep. 24, 2012

(65) Prior Publication Data
US 2014/0089572 A1    Mar. 27, 2014

(51) Int. Cl.
*G06F 12/08* (2006.01)
*G06F 12/10* (2006.01)

(52) U.S. Cl.
CPC ........ *G06F 12/1009* (2013.01); *G06F 12/1072* (2013.01); *G06F 2212/682* (2013.01)

(58) Field of Classification Search
CPC ...................................................... G06F 12/00
USPC ......... 711/103, 105, 121, 130, 144, 147, 162, 711/166, 170, 202
See application file for complete search history.

(56) References Cited

U.S. PATENT DOCUMENTS

| | | | | |
|---|---|---|---|---|
| 6,105,113 | A * | 8/2000 | Schimmel | 711/146 |
| 7,373,466 | B1 * | 5/2008 | Conway | 711/156 |
| 7,428,626 | B2 * | 9/2008 | Vega | 711/203 |
| 8,438,337 | B1 * | 5/2013 | Garg et al. | 711/121 |
| 2008/0215848 | A1 * | 9/2008 | Sheu et al. | 711/207 |
| 2013/0013888 | A1 * | 1/2013 | Lam et al. | 711/206 |

* cited by examiner

*Primary Examiner* — Aimee Li
*Assistant Examiner* — Tracy Chan
(74) *Attorney, Agent, or Firm* — Park, Vaughan, Fleming & Dowler LLP; Mark Spiller

(57) ABSTRACT

The disclosed embodiments provide a system that performs distributed page-table lookups in a shared-memory multiprocessor system with two or more nodes, where each of these nodes includes a directory controller that manages a distinct portion of the system's address space. During operation, a first node receives a request for a page-table entry that is located at a physical address that is managed by the first node. The first node accesses its directory controller to retrieve the page-table entry, and then uses the page-table entry to calculate the physical address for a subsequent page-table entry. The first node determines the home node (e.g., the managing node) for this calculated physical address, and sends a request for the subsequent page-table entry to that home node.

18 Claims, 7 Drawing Sheets

DISTRIBUTED PAGE-TABLE LOOKUPS IN A SHARED-MEMORY SYSTEM

BACKGROUND

1. Field of the Invention

This disclosure generally relates to techniques for reducing latency in shared-memory multiprocessor computer systems. More specifically, this disclosure relates to techniques for reducing address-translation latency for page-table walks in shared-memory multiprocessor systems.

2. Related Art

Computer memory is typically divided into a set of fixed-length blocks called "pages." An operating system can provide a virtual memory abstraction to give a program the impression that it is accessing a contiguous address space that is larger than the actual available physical memory of the underlying computer system. During operation, the operating system and hardware of the computing device translate virtual addresses into physical addresses in the physical memory. These translated physical addresses are then used to access the desired data from the memory hierarchy.

The latency caused by such address translation can significantly impact the performance of shared-memory server systems. Accessing a virtual address typically involves using specialized translation hardware to determine a corresponding memory address. This translation hardware often includes a translation lookaside buffer (TLB) which caches page-table translation information to improve the speed of virtual address translations. Modern processors use multiple levels of such TLBs to avoid the latency of page-table lookups. However, growing data-set sizes and an increase in the number of hardware threads that share a TLB are increasing TLB pressure, thereby resulting in increased TLB miss rates. In modern multiprocessor systems, a miss in a multi-level TLB initiates a page-table walk, which typically involves several DRAM accesses that can take hundreds of clock cycles to complete.

Hence, what is needed are system structures and techniques for managing virtual address translations without the above-described problems of existing techniques.

SUMMARY

The disclosed embodiments provide a system that performs distributed page-table lookups in a shared-memory multiprocessor system with two or more nodes, where each of these nodes includes a directory controller that manages a distinct portion of the system's address space. During operation, a first node receives a request for a page-table entry that is located at a physical address that is managed by the first node. The first node accesses its directory controller to retrieve the page-table entry, and then uses the page-table entry to calculate the physical address for a subsequent page-table entry. The first node determines the home node (e.g., the managing node) for this calculated physical address, and sends a request for the subsequent page-table entry to that home node.

In some embodiments, performing a page-table walk comprises sequentially accessing multiple page-table entries using distributed page-table lookups. When compared with an approach where a centralized requesting node contacts and pulls page-table data from multiple different nodes, performing distributed page-table lookups reduces address-translation latency by reducing the communication overhead for the page-table walk.

In some embodiments, the shared-memory multiprocessor system uses a multi-level page table, and multiple distributed page-table lookups on different nodes are used to hierarchically traverse the multi-level page table during a page-table walk. In alternative embodiments, the shared-memory multiprocessor system uses a hash-based page table, and multiple distributed page-table lookups on different nodes are used to sequentially traverse a linked list of page-table entries in the hash-based page table during a page-table walk.

In some embodiments, the request received by the first node includes aggregated information from previous page-table-entry lookups of the page-table walk. Furthermore, in some embodiments the directory controller of the first node is configured to add the retrieved page-table entry to this aggregated information and include the aggregated information in the request that is sent to the home node.

In some embodiments, the subsequent page-table entry is the last page-table entry needed to complete the page-table walk. If this is the case, the home node uses the subsequent page-table entry to perform a virtual-to-physical address translation for a virtual address that triggered the page-table walk, and then sends the aggregated page-table entries for the page-table walk and the virtual-to-physical address translation to the requesting node that initiated the page-table walk.

In some embodiments, the first node uses calculation hardware in its directory controller and/or a page-table walker to calculate the subsequent physical address.

In some embodiments, the directory controllers of the nodes are configured to distinguish address-translation requests and responses from data coherence transactions.

In some embodiments, accessing the directory controller to retrieve the page-table entry comprises one or more of: (1) determining that the page-table entry is being cached by another node and forwarding the request to that caching node; and (2) accessing a DRAM in the first node. If the page-table entry is being cached by another node, the caching node may be configured to: access the page-table entry from the cache; use the page-table entry to perform the calculations for the subsequent physical address; and forward the subsequent request to the appropriate home node.

DETAILED DESCRIPTION

Figure 1:
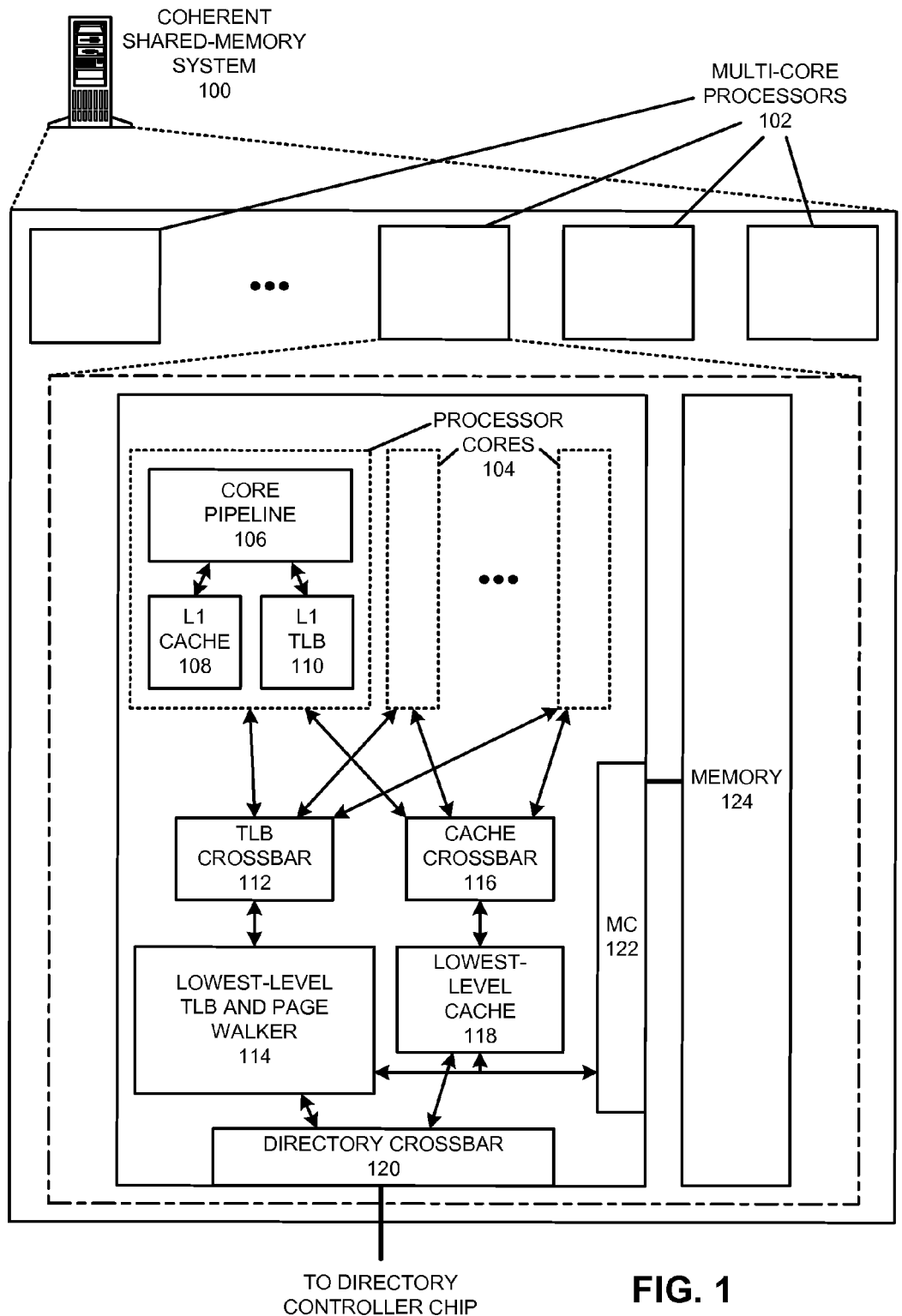
FIG. 1 illustrates an exemplary architecture of two or more multi-core processors in a coherent shared-memory multiprocessor system in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

1. Pane-Table Walks in Multiprocessor Systems

The latency caused by address translation can significantly impact the performance of shared-memory multiprocessor systems. Modern high-performance multiprocessors typically devote large areas of semiconductor real estate to specialized hardware structures that cache frequently accessed data and speed up address translations. For instance, such specialized hardware structures may include multiple levels of SRAM (or DRAM) caches and multiple levels of translation lookaside buffers (TLBs), which cache page-table translations to avoid the high latency of page-table walks.

However, TLB performance is unfortunately degrading in current systems, and seems likely to continue to degrade in future systems. For instance, growing workload data-set sizes and ongoing increases in the number of hardware threads that share a TLB level increase TLB pressure, thereby increasing TLB miss rates. Furthermore, due to on-chip network and power limitations, future systems are likely to comprise multiple "chiplets" (e.g., small, independent chip multiprocessors that are combined to form a large-scale logically monolithic multiprocessor) interconnected by high-performance optical networks. In such designs, a large last-level TLB per chiplet may not be an effective or achievable solution. For example, power and area constraints on a chiplet might not permit a large last-level TLB. Secondly, a large per-chiplet TLB only enables sharing within a given chiplet. In modern multiprocessor systems, a miss in a multi-level TLB initiates a page-table walk, which typically involves several DRAM accesses to read an often hierarchical page table that stores the needed virtual-to-physical address mappings; such DRAM accesses can take hundreds of clock cycles to complete.

Page-table organization often depends on the hardware architecture and the operating system of a computing device. For instance, some hardware architectures organize page tables as multi-level tree-structured tables (e.g., the x86 hardware architecture, which implements multi-level page-table walks in hardware). In such architectures, an access to a page-table level returns a page-table entry (PTE) that points to a memory address in the next page-table level. For example, in implementations that use a four-level page table, a TLB miss leads to a page-table walk that sequentially accesses all four levels of the page table to resolve the virtual address. Note that implementing page-table walks in hardware often limits the ability of an operating system to manage page-table structure and lookup techniques.

One exemplary alternative page-table organization implements a translation storage buffer (TSB) in combination with an operating-system-managed page table. The operating system allocates the TSB as a memory buffer (in main memory) that serves as a single-level translation cache of recently used address translations between the TLB and the page table. More specifically, the TSB acts as one last memory-based cache of translation information that is checked (e.g., as a last resort) before incurring the penalty of a full page-table access. Note that while specialized hardware structures may be used to search the TSB, the TSB is not a dedicated hardware cache; while the TSB lookup typically involves a memory access, this single access is much faster than a full page-table walk. On a TLB miss, the hardware of the computing device is configured to first search the TSB and, if the translation is not found, transfer control (e.g., "trap") to the operating system to perform a software page-table walk. In this scenario, because the actual page-table walk is performed in software, different operating systems are allowed to organize page tables differently. For example, one operating system may organize a page table in software as a multi-level structure (e.g., as in the x86 architecture), while another operating system may implement a hash-based page table. In a hash-based approach, the hash table maps a virtual address to a linked list of potential translations that is then searched sequentially upon a TLB (and/or TSB, if included) miss. For instance, in some exemplary systems the size of the hash table may be chosen based on the size of physical memory such that, on average, the size of each linked list is less than a certain number of entries.

Regardless of the specific page-table organization (e.g., multi-level, hash-based, etc.) a page-table walk typically performs multiple sequentially dependent memory accesses to resolve an address translation. Note that when the preceding exemplary page-table organizations are considered in the context of a shared-memory multiprocessor system, the page-table levels and hash-table buckets are not pinned to any particular physical location, and thus each access during the page-table walk may be to a separate physical node in a distributed system. For example, page-table entries (and/or levels) may be distributed across the system (or placed in a particular location), such that a node performing a page-table walk might not find needed page-table entries in its local memory. Hence, the overhead of page-table walks in such a system may be higher, because each level of a page table may be stored in a remote memory or a remote processor's cache, and require a requesting processor to perform several sequentially dependent remote accesses over the coherency interconnect to resolve an address translation. Note also that in this disclosure, each of these accesses is referred to as an access to a level of a page table, regardless of the page-table organization.

Figure 2:
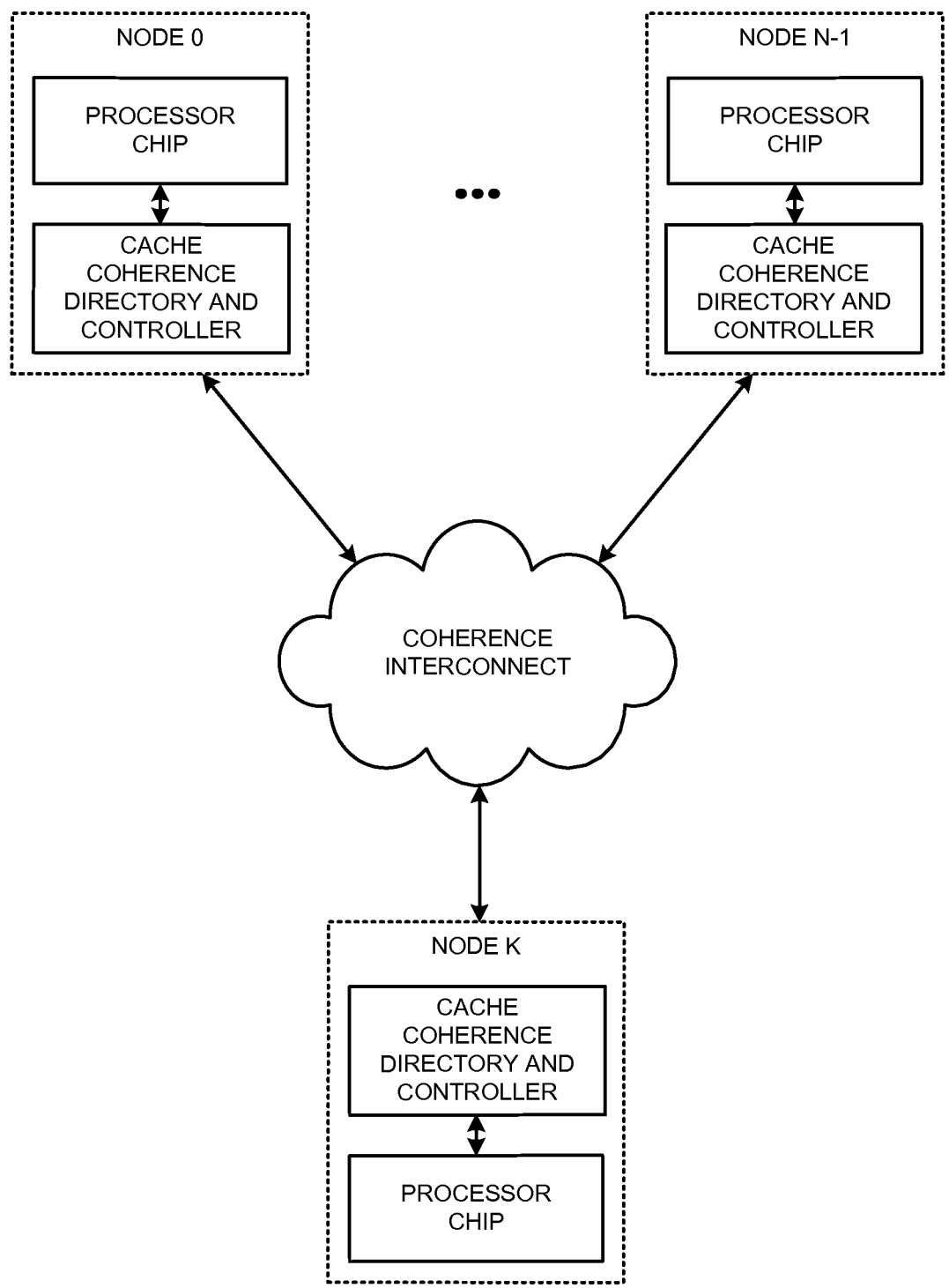
FIG. 2 illustrates a cache-coherent shared-memory multiprocessor system with N multi-core processor nodes in accordance with an embodiment.

FIGS. 1-2 illustrate an exemplary architecture of one or more multi-core processor nodes 102 in a coherent shared-memory (COHSHM) multiprocessor system 100. In FIG. 1, multi-core processor nodes 102 each comprise a chip-multi-processor and memory, and are interconnected using a coherency network. Nodes 102 can use a range of coherency protocols (e.g., the MOESI or MESI cache coherence protocols) to perform remote memory accesses or otherwise communicate.

Multi-core processor nodes 102 illustrate an exemplary processor architecture in which two or more processor cores 104 each include a core pipeline 106 with a private L1 TLB 110 and L1 cache 108. The processor cores 104 access a shared lowest-level (e.g., L2) TLB 114 via a TLB crossbar 112 and access a shared lowest-level (e.g., L2) cache 118 via a second cache crossbar 116. A TLB controller in TLB 114 can prompt a hardware page-table walker to communicate with a memory controller (MC) 122 to access page tables in a shared memory 124 when address translations miss in TLB 114. A directory crossbar 120 facilitates communication with a directory controller chip and other nodes of the COHSHM multiprocessor system 100 via a coherency interconnect. Note that the described concepts are independent of the number of TLB and cache levels in a processor architecture, and can be implemented across a range of different processor architectures. Note also that the described concepts are independent of the interconnect topology that is used to connect the nodes of the coherent shared-memory multiprocessor, and can be implemented across a range of interconnect types and topologies.

FIG. 2 illustrates a coherent shared-memory multiprocessor system with N multi-core processor nodes. In some embodiments, each node consists of a processor chip and a directory chip that includes a cache coherence directory and directory controller. The physical address space for coherent shared-memory multiprocessor system 100 can be partitioned among the nodes, with each directory chip serving as the "home" (e.g., containing a data cache directory (DC DIR)) for a subset of the physical address space; such an architecture is often referred to as a "cache-coherent non-uniform memory access (CC-NUMA) architecture." The DC DIR in a node maintains state for every cache line in its allocated subset that is cached anywhere in the system. A range of coherence protocols (e.g., the MOESI cache coherence protocol) can be used to maintain cache coherence across the nodes. Note that the architectures illustrated in FIGS. 1-2 are exemplary, and that the described techniques are not limited to the illustrated shared-memory systems; the described techniques and structures can be applied to a range of other architectures. For example, the multi-core processor and directory chip (or even multiple processors and directories) may be combined into one hardware unit. Other alternative architectures may include directory chips that are external to the node, and/or have a range of different mappings of physical addresses (or memory pages) to directories and nodes.

Figure 3A:
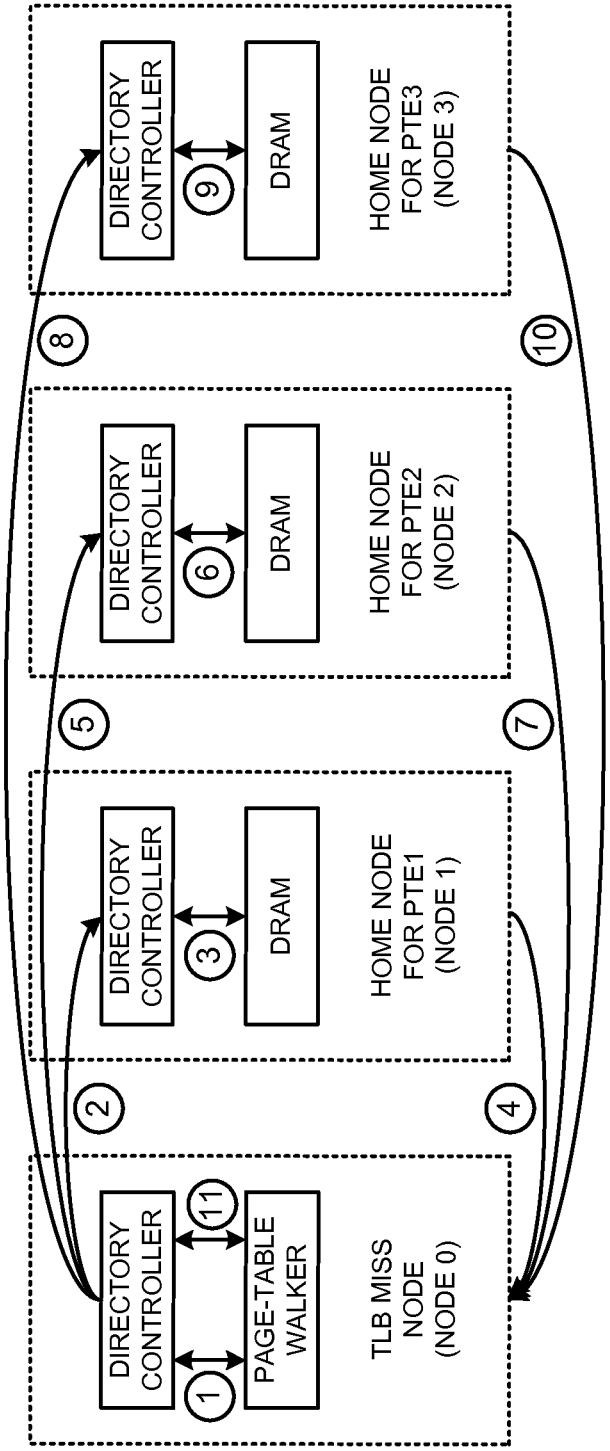
FIG. 3A illustrates the process of performing a three-level page-table walk to resolve a virtual-to-physical address translation that misses in a TLB of a coherent N-node shared-memory multiprocessor system in accordance with an embodiment.

FIG. 3A illustrates the process of performing a three-level page-table walk to resolve a virtual-to-physical address translation that misses in a TLB of the coherent N-node shared-memory multiprocessor system illustrated in FIGS. 1-2. The example illustrated in FIG. 3A illustrates a scenario where all PTE accesses miss in the local data caches. In FIG. 3A, Node 0 is the node in which a processor core experiences a TLB miss, Node 1 stores the portion of the first-level page table that includes the first-level PTE (PTE1), Node 2 stores the portion of the second-level page table that includes the second-level PTE (PTE2), and Node 3 stores the portion of the third-level page table that includes the third-level PTE (PTE3). Note that while these four nodes include the hardware described for FIGS. 1-2, FIG. 3A illustrates only the components relevant to the page-table walk. Note also that a page-table-related memory access that misses in a node's local cache hierarchy may be forwarded to a remote node in the same manner as a conventional data cache miss.

During operation, a page-table walker in Node 0 accesses the PTEs for each page-table level by issuing conventional memory access instructions to the processor's cache hierarchy. A TLB miss in Node 0 prompts Node 0's page-table walker to first check the node's local cache hierarchy for the physical address associated with the first-level PTE (operation 1). If this cache access misses, the request is forwarded to Node 0's memory controller, which: (1) determines that this physical address is remote; (2) determines that Node 1 is the corresponding home node for the physical address; and (3) sends a read request to Node 1's directory controller (operation 2). Node 1's directory controller receives the read request, and checks the directory to determine if the address is cached elsewhere in the system. If not, Node 1's directory controller accesses Node 1's local DRAM for the requested address (operation 3), and then sends a reply with the requested PTE back to Node 0's directory controller (operation 4). After receiving the level-one PTE, Node 0's page-table walker: (1) calculates the physical address of the second-level PTE; (2) determines that this physical address misses in the local data cache hierarchy, and that Node 2 is the corresponding home node for the physical address; and (3) issues a new read request for that address to Node 2's directory controller (operation 5). Node 2's directory controller accesses Node 2's local DRAM for the requested address (operation 6), and sends the requested PTE back to Node 0's directory controller (operation 7). A substantially similar process is then repeated sequentially for the remaining levels of the page table (e.g., operations 8-10 access a third-level PTE from a third node, Node 3). Node 0 then uses the final (lowest-level) PTE to perform the needed virtual-to-physical address translation. Note that the illustrated lookup operations need to be sequential, because Node 0's page-table walker needs to compute the physical address of each successive level's PTE using the most recently received PTE.

Figure 3B:
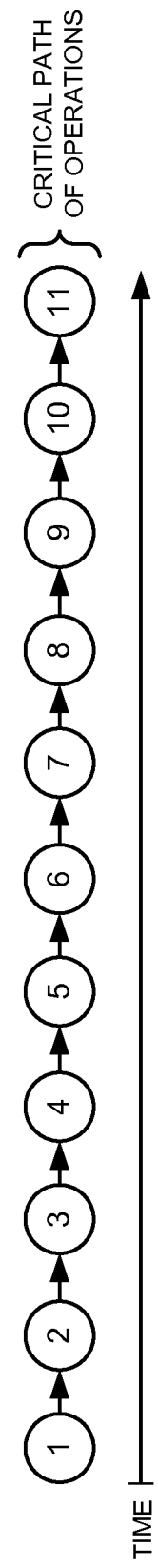
FIG. 3B illustrates a timeline for the operations illustrated in FIG. 3A in accordance with an embodiment.

The timeline in FIG. 3B illustrates how the operations illustrated in FIG. 3A are all on the critical path of a page-table walk. The total latency on the critical path of the memory operation is given by:

$$T_{critical} = T_{pagetablewalker} + T_{L1req} + T_{DRAM1} + T_{L1resp} + T_{L2req} + T_{DRAM2} + T_{L2resp} + T_{L3req} + T_{DRAM3} + T_{L3resp} + T_{calc},$$

where: $T_{pagetablewalker}$ is the time needed to send TLB miss requests to Node 0's local directory controller; $T_{L1req}$, $T_{L2req}$, and $T_{L3req}$ are the times needed to determine and/or calculate the address of a PTE and send read requests to the directory controllers of Nodes 1, 2, and 3, respectively; $T_{DRAM1}$, $T_{DRAM2}$, and $T_{DRAM3}$ are the times needed for the home nodes to probe their directories and access their DRAMs to fetch the requested PTEs; $T_{L1resp}$, $T_{L2resp}$, and $T_{L3resp}$ are the times needed to send the requested PTEs back to Node 0; and $T_{calc}$ is the time needed to calculate the full translation using the final PTE.

Note that, for clarity, the example illustrated in FIG. 3A illustrates an "all-DRAM" case that assumes that the requested PTEs are not cached anywhere in the distributed system, and need to be fetched from a DRAM. In scenarios where a requested PTE is cached in another node's data cache, the directory controller of the home node may instruct the caching node to forward the PTE to the requesting node instead of accessing the PTE from the DRAM.

Embodiments of the present invention seek to reduce page-table-walk-related coherence-operation latencies by reducing the number of latency components that are in the critical path of page-table walks. For instance, the PTE accesses and address calculations for each of the page-table walk's levels can be distributed across the directory controllers of the nodes involved in a given page-table walk, thereby reducing (or even sometimes eliminating) intermediate response messages and improving page-table-walk performance.

2. Distributed Page-Table Lookups

In some embodiments, the nodes of a coherent shared-memory multiprocessor system are enhanced to facilitate distributed page-table lookups. For instance, the page-table walkers and/or directory controllers of the nodes may be enhanced to calculate the address of the PTE of the next level of a page table and forward translation requests to other remote nodes, thereby eliminating the need to centralize each page-table-walk operation at the requesting node. These techniques may involve (1) augmenting each directory controller with hardware that can perform an address calculation to determine the address of the PTE for the next page-table level; and/or (2) extending each node's directory controller to aggregate and forward higher-level PTEs and resolved translations for the current page-table walk to the requesting node, so that the requesting node can cache that information for future translations and page-table walks. The directory controllers may also be modified to support additional interconnect message types that distinguish address-translation requests and responses from data coherence transactions. Distributed page-table-lookup techniques reduce address-translation latency by reducing the number of messages that are sent between nodes during a page-table walk, thereby improving performance.

Figure 4A:
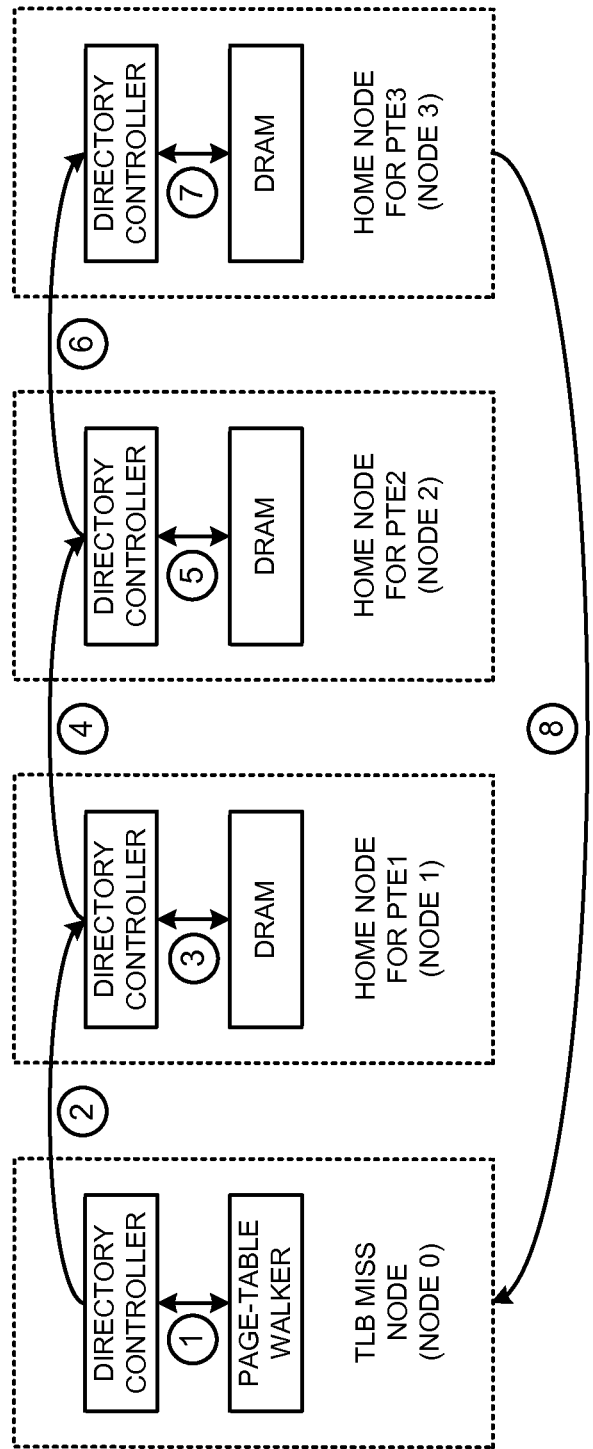
FIG. 4A illustrates the process of performing a distributed three-level page-table walk in a cache-coherent shared-memory multiprocessor system when none of the requested page-table entries are cached in the nodes of the system in accordance with an embodiment.

FIG. 4A illustrates the process of performing a distributed three-level page-table walk across the relevant nodes of a CC-NUMA multiprocessor system. As in FIG. 3A, the example of FIG. 4A illustrates an all-DRAM case where none of the requested PTEs is currently cached in any of the nodes of the distributed system. Also, as in FIG. 3A, FIG. 4A illustrates only the components relevant to the page-table walk.

During operation, a TLB miss in Node 0 prompts Node 0's page-table walker to request a read from Node 0's local directory controller for the physical address associated with the required first-level PTE (operation 1). As in FIG. 3A, Node 0's directory controller determines the home node (Node 1) for the first-level PTE (PTE1), but now sends a 'distributed page-table-walk' request message (whose contents are described in more detail below) to Node 1 (operation 2). Node 1's directory controller accesses its DRAM for the requested address (operation 3), and Node 1's directory controller uses PTE1 to calculate the physical address of the second-level PTE (PTE2) and then sends a 'distributed page-table-walk' request to the home node for PTE2, Node 2 (operation 4). Node 2's directory controller accesses its DRAM for the requested address (operation 5), calculates the third-level PTE's (PTE3) physical address, and upon determining that Node 3 is the home node for PTE3, sends a 'distributed page-table-walk' request to Node 3 (operation 6). Node 3's directory controller retrieves PTE3 from its DRAM (operation 7), calculates the final address translation, and then sends a 'completed distributed page-table walk' message. Note that in some embodiments, as each stage of the distributed page-table walk is completed, the PTEs retrieved from DRAM are aggregated and forwarded to the next node in the chain, and the directory controllers on each intermediary home node mark the requesting node as a sharer for the system cache lines that contain each PTE. Hence, in such embodiments, the requesting node receives all levels of PTEs, which allows the requesting node to cache these PTEs locally (as it would in the non-distributed page-table walk illustrated in FIG. 3A).

Figure 4B:
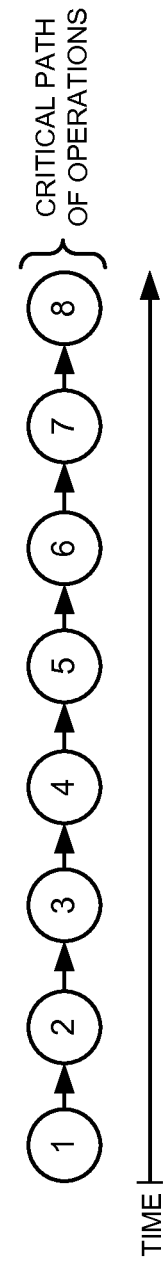
FIG. 4B illustrates a timeline for the operations illustrated in FIG. 4A in accordance with an embodiment.

The timeline in FIG. 4B illustrates how distributed page-table walk techniques shorten the critical path of a page-table walk by eliminating two interconnect latency components. The total latency on the critical path of the memory operation is given by:

$$T_{critical} = T_{pagetablewalker} + T_{L1req} + T_{DRAM1} + T_{L2req} + T_{DRAM2} + T_{L3req} + T_{DRAM3} + T_{TLB\_resp}.$$

The disclosed techniques can save n-1 messages for an n-level page-table walk, while also eliminating n-1 data cache hierarchy accesses on the requesting node; note that the data cache hierarchy accesses are not shown in the equations or figures. Given the long message latencies of switched interconnects in shared memory systems, eliminating messages that return intermediate PTEs to the requesting node from the critical path can save hundreds of clock cycles. Note that these performance benefits are possible without substantially changing PTE access patterns; more specifically, the same nodes are still accessed, but each node performs a small amount of additional computation instead of sending the requested PTE back to the requesting node.

Note that in some embodiments the disclosed techniques can further reduce translation latency. For instance, for the page-table walk described in FIG. 3A, a requesting node may probe its local cache at each level of the page-table walk (e.g., every time it computes a PTE address for a subsequent page-table level, before sending the request on to the directory controller of the next home node). In contrast, in some embodiments, distributed page-table walk techniques may directly send requests to a PTE's home node instead of probing local caches. The benefits of reducing the number of cache probes are often smaller than the benefits of reducing the number of inter-node messages, but do further improve address translation performance.

Figure 5A:
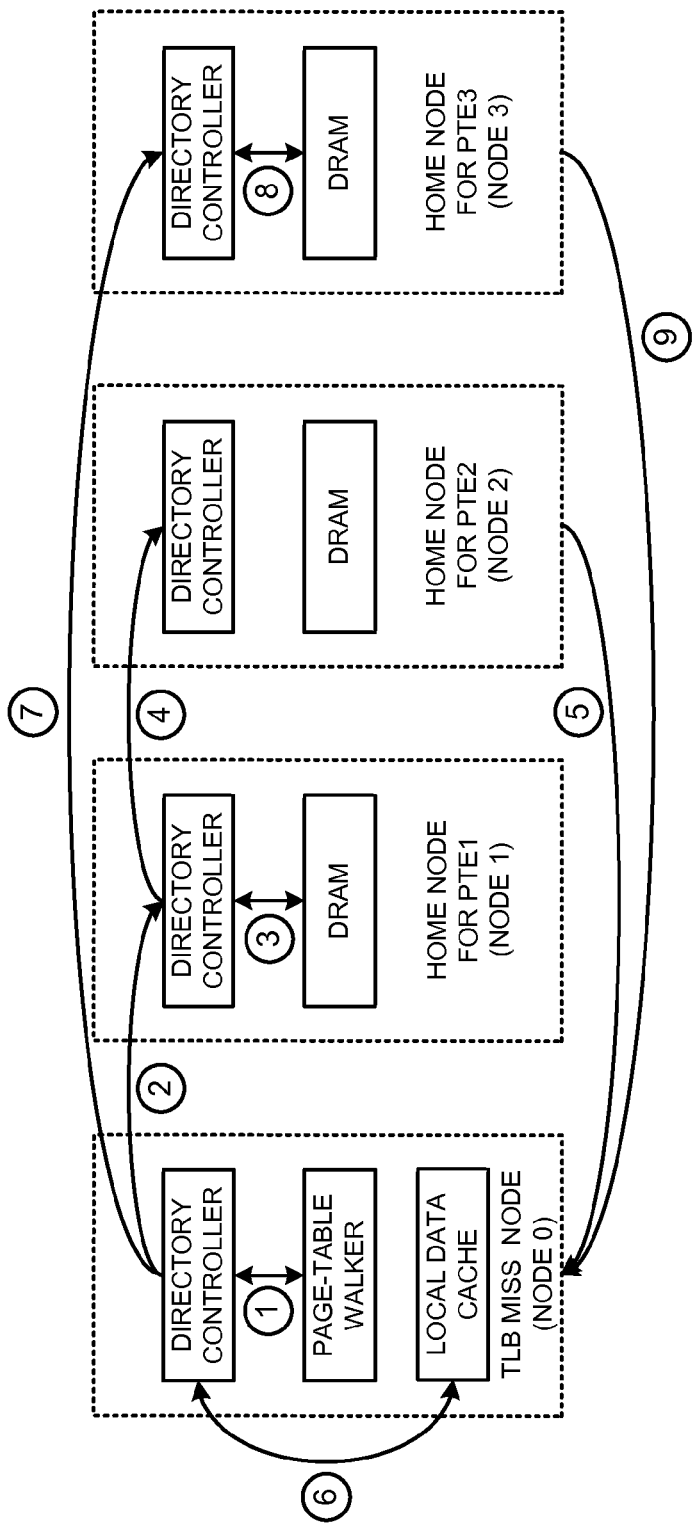
FIG. 5A illustrates the process of performing a distributed three-level page-table walk in a cache-coherent shared-memory multiprocessor system when one of the requested page-table entries is cached in one or more nodes of the system in accordance with an embodiment.

FIG. 5A illustrates a distributed three-level page-table walk for an alternative scenario in which one of the PTEs for the page-table walk is cached in one or more nodes of the CC-NUMA multiprocessor system. The home node directory for a given PTE's physical address tracks whether that PTE is cached anywhere in the system. Upon receiving a request for a PTE, the home node probes its directory, and if the requested PTE is in the data cache of a node in the system, forwards the 'distributed page-table-walk' message to the caching node's directory controller. The caching node's directory controller can then retrieve the cached PTE from its local data cache, calculate the next level PTE's physical address, and forward the 'distributed page-table-walk' request to the next node in the chain (as described for FIG. 4A). For example, in FIG. 5A, Node 1 accesses PTE1 from memory, calculates the address of PTE2, and then sends a 'distributed page-table-walk' request to the home node for PTE2, Node 2 (operations 3 and 4, as described for FIG. 4A). In FIG. 5A, however, the directory controller on Node 2, upon probing its directory, determines that the requesting (Node 0) is caching a copy of PTE2 in its data cache. Hence, Node 2's directory controller sends a distributed page-table walk request to Node 0 (operation 5). Upon receiving this request, Node 0's directory controller accesses PTE2 from its local data cache (operation 6), uses PTE2 to calculate the address of the third-level PTE, and forwards a 'distributed page-table-walk' request to PTE3's home node, Node 3 (operation 7). Note that, as described for FIG. 4A, the PTEs retrieved from caches and DRAMs can be aggregated and forwarded to the requesting node. In scenarios where a caching node receives a request for a last-level page-table entry, the caching node may also be configured to perform the final step of address translation and send the translation information to the requesting node. Note also that while FIG. 5A does not illustrate all of the many possible arrangements of cached and non-cached PTE combinations, this example illustrates how such scenarios can be resolved.

Figure 5B:
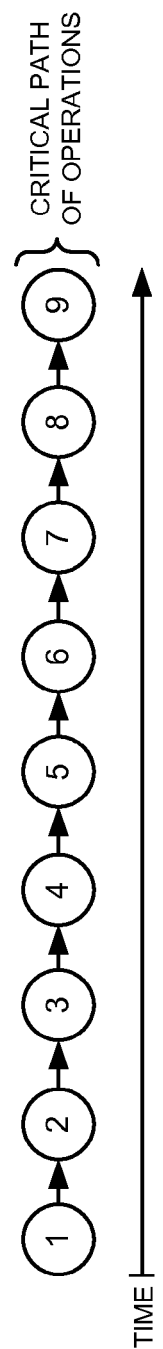
FIG. 5B illustrates a timeline for the operations illustrated in FIG. 5A in accordance with an embodiment.

The timeline in FIG. 5B illustrates the critical path of the exemplary page-table walk of FIG. 5A. The total latency on the critical path of the memory operation is given by:

$$T_{critical} = T_{pagetablewalker} + T_{L1req} + T_{DRAM1} + T_{L2req} + T_{cache\_acc} + T_{L3req} + T_{DRAM3} + T_{TLB\_resp},$$

where $T_{cache\_acc}$ is the time needed for: (1) a directory controller to determine that a PTE is cached in another node's local data cache; (2) the directory controller to send a PTE-read request to the caching node; and (3) the directory controller on the caching node to access the data cache on the caching node. Note that the time needed to transfer the request to the caching node and access the caching node's data cache is typically much less than the time needed for a DRAM access.

Note that while FIGS. 3-5 illustrate examples for a three-level page-table walk, the disclosed techniques are not limited to such page-table organizations. More specifically, the disclosed techniques can be applied to multi-level page-table organizations, hash-based page-table organizations, and other page-table organizations. In the preceding examples, each of the sequentially dependent PTE accesses is an access to a PTE in a specific level of the page table, and the disclosed techniques can operate in the same manner with page tables that comprise fewer or more levels by repeating the key steps of acquiring the current PTE, calculating the next PTE's address, and forwarding the request to the next home node as often as needed. In a hash-based page-table organization, the term 'PTE' instead refers to an element in a linked list that is identified using a hash of the virtual address, and accessing level i refers to examining the list element at position i in that linked list. Note that while the number of levels in a multi-level page table is typically fixed, the length of a given linked list in a hash-based page table may vary (e.g., be as low as one, or substantially higher than the number of levels in a comparably sized multi-level page table). The performance benefits of the disclosed techniques increase as the number of PTE lookups for a page-table walk increases.

In some embodiments, the format and contents of a 'distributed page-table-walk' request and a 'completed distributed page-table-walk' message depend on the hardware architecture and/or the underlying page-table organization. For instance, for a multi-level page-table organization (e.g., as in the x86 architecture), a 'distributed page-table-walk' request may comprise: (1) the virtual address being translated; (2) the address of the PTE needed to access the next level of the page table; and (3) the PTEs retrieved from the preceding page-table levels for the virtual address. In contrast, a 'distributed page-table-walk' request for the previously described hash-based page-table organization may comprise: (1) the virtual address being translated; (2) the address of the element in the linked list currently being accessed; and (3) the contents of the elements of the linked list of PTEs that have already been accessed. In both organizations the 'completed distributed page-table-walk' message includes all of the PTEs accessed during the page-table walk (e.g., the PTEs accessed at all levels of the page table in the multi-level organization, or all of the nodes of the linked list that were accessed during the page-table walk in the hash-based organization).

In some embodiments, the disclosed techniques involve adding additional computational structures to a processor and/or directory controller chip. For instance, an additional arithmetic logic unit (ALU) may be added to each node to support the described PTE address calculations. In some alternative embodiments, existing hardware structures (e.g., existing processor ALUs) may be leveraged for PTE address calculations. Adding an additional ALU may involve minimal additional area while ensuring that no additional load is put on existing structures. A separate, additional ALU may also be beneficial for system architectures in which address computation occurs on a separate directory controller chip that does not have such processing capabilities.

In some embodiments, the logic needed to calculate the address of a PTE may also depend on the hardware architecture and/or the underlying page-table organization. For instance, in a multi-level page-table organization the address-computation logic may combine a subset of the bits from the virtual address with an address for the next level page table (that is specified in the PTE of the current level) to calculate the address of the PTE in the next level. Alternatively, in the hash-based page-table organization, the address-computation logic may instead resolve a 'pointer' in a linked list element as a fixed offset (e.g., an offset set by the operating system at boot time) from the address of a current element.

Note that FIGS. 1-5B illustrate a coherent shared-memory system with generic page-table walkers. In some embodiments, the disclosed techniques can be applied to systems with either hardware or software page-table walkers.

Figure 6:
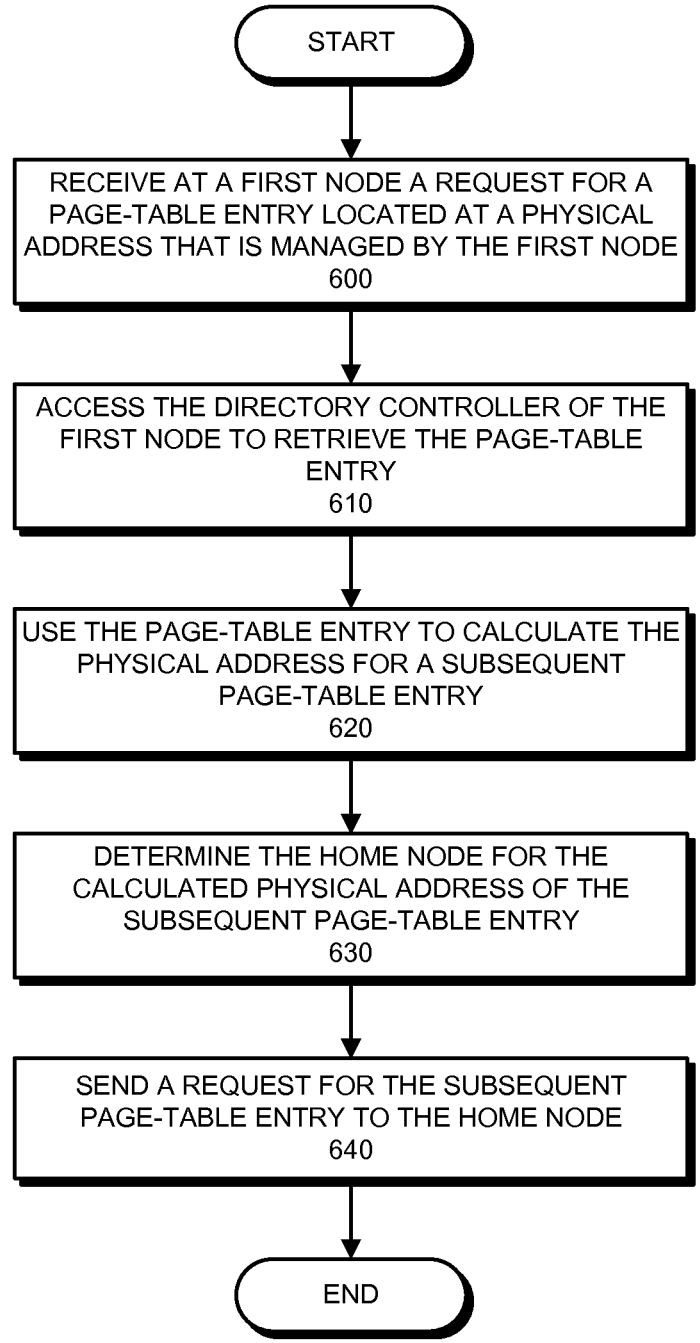
FIG. 6 presents a flow chart that illustrates the process of performing distributed page-table lookups in a shared-memory multiprocessor system with two or more nodes in accordance with an embodiment.

FIG. 6 presents a flow chart that illustrates the process of performing distributed page-table lookups in a shared-memory multiprocessor system with two or more nodes, where each of these nodes includes a directory controller that manages a portion of the system's address space. During operation, a first node receives a request for a page-table entry located at a physical address that is managed by the first node (operation 600). The first node accesses its directory controller to retrieve the page-table entry (operation 610), and then uses the page-table entry to calculate the physical address for a subsequent page-table entry (operation 620). The first node determines the home node (e.g., the managing node) for this calculated physical address (operation 630), and sends a request for the subsequent page-table entry to that home node (operation 640). The disclosed distributed page-table-lookup techniques distribute each level of the page-table walk's PTE accesses and address calculations to the directory controllers of the nodes involved in a given page-table walk, thereby reducing address-translation latency by reducing the communication overhead for page-table walks.

3. Considerations for Distributed Page-Table Lookups

Note that the disclosed distributed page-table-lookup techniques are distinct from other techniques that attempt to reduce page-table-walk penalties. For instance, some page-table-access techniques use data and page-table replication in an attempt to ensure that, on average, needed pages will more likely be local to a requesting node, thereby reducing the average latency of a physical memory access. However, such replication/migration techniques lead to additional memory and interconnect traffic overhead. In contrast, the disclosed distributed page-table-lookup techniques do not require any additional movement of page tables between nodes.

Another set of techniques that attempt to reduce page-table-walk overhead involve "translation caches" that seek to avoid memory hierarchy accesses in the event of a page-table walk by either caching individual levels of page tables or storing sets of intermediate page-table entries for a given set of translations. Upon initiating a page-table walk, such systems check these caches to determine whether translation information is being cached for the virtual address that needs to be translated. However, such techniques require additional hardware cache structures to store this intermediate translation information. In contrast, the disclosed distributed page-table-lookup techniques do not involve storing additional translation data, and hence do not require additional hardware structures and logic to maintain page-table consistency.

Some techniques attempt to reduce page-table-walk overhead by attempting to predictively pre-fetch translation data before it is needed by a processor performing a page-table walk. However, pre-fetching techniques can introduce synchronization overhead (among multiple nodes) as well as also introduce false accesses that waste power and communication bandwidth. In contrast, the disclosed distributed page-table-lookup techniques do not pre-fetch, but instead perform memory accesses for page-table walks on an on-demand basis.

Note that distributed page-table-lookup techniques can be used in conjunction with a range of coherence protocols (e.g., the MOESI cache coherence protocol) that maintain cache coherence across the nodes; more specifically, the described techniques can build upon any cache coherence protocol that facilitates maintaining coherence across multiple caches. Note also that, as mentioned previously, the architectures illustrated in FIGS. 1-5B are exemplary; the described techniques and structures are not limited to the described shared-memory systems, and can be applied to a range of architectures.

In summary, embodiments of the present invention distribute remote memory reads and address calculations to reduce the serialization latency experienced during a page-table walk on a CC-NUMA system. PTE accesses and address calculations for each of a page-table walk's levels are distributed across the directory controllers of the nodes involved in a given page-table walk, thereby eliminating intermediate response messages and improving page-table-walk performance. Specific advantages of the disclosed techniques include:

eliminating intermediate PTE response messages during a page-table walk, thereby reducing the page-table-walk critical path latency by hundreds of cycles;

involving only logic changes to a shared-memory system—no additional hardware storage structures are required;

not requiring any application-level changes;

not requiring any operating system changes for processors with hardware page-table walkers;

being general enough to be implemented across a range of operating systems and hardware platforms with different page-table organizations.

4. Computing Environment

Figure 7:
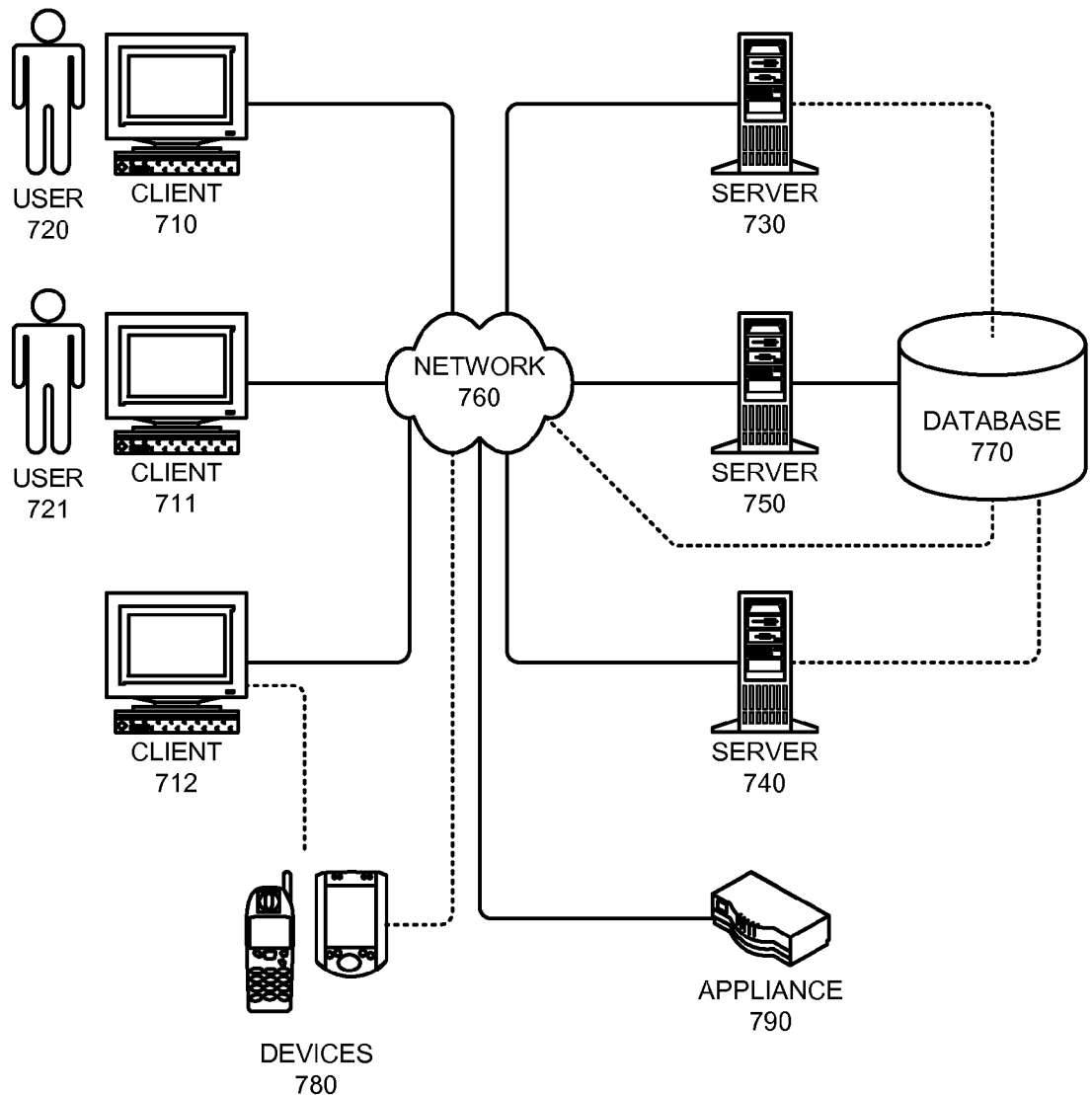
FIG. 7 illustrates a computing environment in accordance with an embodiment.

In some embodiments of the present invention, distributed page-table-lookup techniques can be incorporated into a wide range of computing devices in a computing environment. For example, FIG. 7 illustrates a computing environment 700 in accordance with an embodiment of the present invention. Computing environment 700 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 7, computing environment 700 includes clients 710-712, users 720 and 721, servers 730-750, network 760, database 770, devices 780, and appliance 790.

Clients 710-712 can include any node on a network that includes computational capability and includes a mechanism for communicating across the network. Additionally, clients 710-712 may comprise a tier in an n-tier application architecture, wherein clients 710-712 perform as servers (servicing requests from lower tiers or users), and wherein clients 710-712 perform as clients (forwarding the requests to a higher tier).

Similarly, servers 730-750 can generally include any node on a network including a mechanism for servicing requests from a client for computational and/or data storage resources. Servers 730-750 can participate in an advanced computing cluster, or can act as stand-alone servers. For instance, computing environment 700 can include a large number of compute nodes that are organized into a computing cluster and/or server farm. In one embodiment of the present invention, server 740 is an online "hot spare" of server 750. In other embodiments, servers 730-750 include coherent shared-memory multiprocessors.

Users 720 and 721 can include: an individual; a group of individuals; an organization; a group of organizations; a computing system; a group of computing systems; or any other entity that can interact with computing environment 700.

Network 760 can include any type of wired or wireless communication channel capable of coupling together computing nodes. This includes, but is not limited to, a local area network, a wide area network, or a combination of networks. In one embodiment of the present invention, network 760 includes the Internet. In some embodiments of the present invention, network 760 includes phone and cellular phone networks.

Database 770 can include any type of system for storing data in non-volatile storage. This includes, but is not limited to, systems based upon magnetic, optical, or magneto-optical storage devices, as well as storage devices based on flash memory and/or battery-backed up memory. Note that database 770 can be coupled: to a server (such as server 750), to a client, or directly to a network.

Devices 780 can include any type of electronic device that can be coupled to a client, such as client 712. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 780 can be coupled directly to network 760 and can function in the same manner as clients 710-712.

Appliance 790 can include any type of appliance that can be coupled to network 760. This includes, but is not limited to, routers, switches, load balancers, network accelerators, and specialty processors. Appliance 790 may act as a gateway, a proxy, or a translator between server 740 and network 760.

Note that different embodiments of the present invention may use different system configurations, and are not limited to the system configuration illustrated in computing environment 700. In general, any device that includes two or more processing nodes, a page table, and a coherent memory-sharing architecture may incorporate elements of the present invention.

In some embodiments of the present invention, some or all aspects of distributed page-table-lookup techniques can be implemented as dedicated hardware modules in a computing device. These hardware modules can include, but are not limited to, processor chips, application-specific integrated circuit (ASIC) chips, field-programmable gate arrays (FPGAs), memory chips, and other programmable-logic devices now known or later developed.

Note that a coherent shared-memory processor can include one or more specialized circuits for performing the operations of the above-described distributed page-table-lookup techniques. Alternatively, some or all of the operations may be performed using general-purpose circuits that are configured using processor instructions. Also, while FIGS. 1-5B illustrate distributed page-table-lookup techniques as being internal to a processor and/or a directory controller chip, in alternative embodiments some or all of these mechanisms can be external to a processor and/or a directory controller chip.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing distributed multi-stage page-table lookups in a shared-memory multiprocessor system with two or more processors, the method comprising:
   receiving, at a first processor, a request for a page-table entry, wherein the request is associated with a multi-stage address translation operation that was initiated by a requesting processor that is distinct from the first processor, wherein the multi-stage address translation operation comprises multiple sequentially dependent memory accesses for multiple page-table entries that include the page-table entry, wherein the request includes a physical address for the page-table entry, and wherein the first processor includes a directory controller that manages a portion of the address space of the shared-memory multiprocessor system that includes the physical address;
   accessing the directory controller to retrieve the page-table entry;
   using the page-table entry to calculate at the first processor a subsequent physical address for a subsequent page-table entry for the next stage of the multi-stage address translation operation;
   determining a home processor that manages the subsequent physical address;
   sending a subsequent request for the subsequent page-table entry to the home processor; and
   sending a response from the home processor to the requesting processor, wherein the response comprises the subsequent physical address and a final address translation for the multi-stage address translation operation.

2. The method of claim 1,
   wherein performing distributed page-table lookups reduces address-translation latency by reducing the communication overhead for the multi-stage address translation operation.

3. The method of claim 2,
   wherein a page table for the shared-memory multiprocessor system is organized as a multi-level page table; and
   wherein multiple distributed page-table lookups are used to hierarchically traverse the multi-level page table during the multi-stage address translation operation.

4. The method of claim 2,
   wherein a page table for the shared-memory multiprocessor system is organized as a hash-based page table; and
   wherein multiple distributed page-table lookups are used to sequentially traverse a linked list of page-table entries in the hash-based page table during the multi-stage address translation operation.

5. The method of claim 1, wherein the request additionally includes aggregated information from previous stages of page-table-entry lookups for the multi-stage address translation operation, wherein the aggregated information comprises physical addresses for the page-table-entries for the previous stages of page-table-entry lookups,
   wherein the subsequent request comprises the aggregated information, and
   wherein the response additionally comprises the physical address and the aggregated information.

6. The method of claim 5, wherein the home processor uses the subsequent page-table entry to obtain a final physical address by performing a virtual-to-physical address translation for a virtual address that triggered the multi-stage address translation operation, and wherein the response comprises the final physical address.

7. The method of claim 1, wherein the directory controller for the first processor is configured to send the aggregated information to the home processor.

8. The method of claim 7,
   wherein the subsequent page-table entry is the last page-table entry needed to complete the multi-stage address translation operation;
   wherein the home processor uses the subsequent page-table entry to perform a virtual-to-physical address translation for a virtual address that triggered the multi-stage address translation operation; and wherein the home processor sends the aggregated page-table entries accessed during the multi-stage address translation operation and the virtual-to-physical address translation to the requesting processor.

9. The method of claim 2, wherein calculating the subsequent physical address further comprises using calculation hardware in the directory controller of the first processor to calculate the subsequent physical address.

10. The method of claim 2, wherein calculating the subsequent physical address further comprises using calculation hardware in the page-table walker of the first processor to calculate the subsequent physical address.

11. The method of claim 2, wherein the directory controller is configured to distinguish address-translation requests and responses from data coherence transactions.

12. The method of claim 2, wherein accessing the directory controller to retrieve the page-table entry comprises at least one of:
   determining that the page-table entry is being cached by a caching processor and forwarding the request to the caching processor; and
   accessing a DRAM in the first processor.

13. The method of claim 12, wherein forwarding the request to the caching processor further comprises:
   receiving the forwarded request at the caching processor;
   accessing the page-table entry from a cache in the caching processor;
   calculating the subsequent physical address for the subsequent page-table entry in the caching processor;
   determining the home processor in the caching processor; and
   sending the subsequent request from the caching processor to the home processor.

14. A shared-memory multiprocessor that performs distributed multi-stage page-table lookups to reduce address-translation latency, comprising:
   a first processor; and
   two or more additional processors;
   wherein the first processor receives a request for a page-table entry, wherein the request is associated with a multi-stage address translation operation that was initiated by a requesting processor that is distinct from the first processor, wherein the multi-stage address translation operation comprises multiple sequentially dependent memory accesses for multiple page-table entries that include the page-table entry, wherein the request includes a physical address for the page-table entry, and wherein the first processor includes a directory controller that manages a portion of the address space of the shared-memory multiprocessor that includes the physical address; and
   wherein the first processor is configured to:
      access the directory controller to retrieve the page-table entry;
      use the page-table entry to calculate at the first processor a subsequent physical address for a subsequent page-table entry for the next stage of the multi-stage address translation operation;
      determine a home processor of the shared-memory multiprocessor that manages the subsequent physical address; and
      send a subsequent request for the subsequent page-table entry to the home processor; and
   wherein the home node is configured to send a response to the requesting processor that comprises the subsequent physical address and a final address translation for the multi-stage address translation operation.

15. The shared-memory multiprocessor of claim 14,
   wherein performing distributed page-table lookups reduces address-translation latency by reducing the communication overhead for the multi-stage address translation operation.

16. The shared-memory multiprocessor of claim 15,
   wherein a page table for the shared-memory multiprocessor is organized as a multi-level page table; and
   wherein multiple distributed page-table lookups are used to hierarchically traverse the multi-level page table during the multi-stage address translation operation.

17. The shared-memory multiprocessor of claim 15,
   wherein a page table for the shared-memory multiprocessor is organized as a hash-based page table; and
   wherein multiple distributed page-table lookups are used to sequentially traverse a linked list of page-table entries in the hash-based page table during the multi-stage address translation operation.

18. A directory controller structure that facilitates distributed multi-stage page-table lookups for a shared-memory multiprocessor system with two or more processors, wherein each processor chip of the shared-memory multiprocessor system includes an instance of the directory controller structure,
   wherein the directory controller structure for a first processor chip is configured to:
      receive a request for a page-table entry, wherein the request is associated with a multi-stage address translation operation that was initiated by a requesting processor that is distinct from the first processor, wherein the multi-stage address translation operation comprises multiple sequentially dependent memory accesses for multiple page-table entries that include the page-table entry, wherein the request includes a physical address for the page-table entry and the directory controller structure for the first processor manages a portion of the address space of the shared-memory multiprocessor system that includes the physical address;
      retrieve the page-table entry from a DRAM associated with the first processor;
      use the retrieved page-table entry to calculate a subsequent physical address for a subsequent page-table entry for the next stage of the multi-stage address translation operation;
      determine a home processor that manages the subsequent physical address; and
      send a subsequent request for the subsequent page-table entry to the home processor, and
   wherein the home node is configured to send a response to the requesting processor that comprises the subsequent physical address and a final address translation for the multi-stage address translation operation.

* * * * *